US012115691B2

(12) United States Patent
Christofidellis et al.

(10) Patent No.: US 12,115,691 B2
(45) Date of Patent: Oct. 15, 2024

(54) BLADE ASSEMBLY ATTACHMENT MECHANISM AND MODULAR RAZOR ASSEMBLY

(71) Applicant: Bic Violex S.A., Anoixi (GR)

(72) Inventors: Efstratios Christofidellis, Anoixi (GR); Nikolaos Ovvadias, Anoixi (GR); Vasileios Stamoulis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 358 days.

(21) Appl. No.: 17/295,465

(22) PCT Filed: Dec. 12, 2019

(86) PCT No.: PCT/EP2019/084960
§ 371 (c)(1),
(2) Date: May 20, 2021

(87) PCT Pub. No.: WO2020/120703
PCT Pub. Date: Jun. 18, 2020

(65) Prior Publication Data

US 2021/0402629 A1 Dec. 30, 2021

(30) Foreign Application Priority Data

Dec. 14, 2018 (EP) .................................... 18212725

(51) Int. Cl.
*B26B 21/22* (2006.01)
*B26B 21/52* (2006.01)

(52) U.S. Cl.
CPC .......... *B26B 21/521* (2013.01); *B26B 21/225* (2013.01)

(58) Field of Classification Search
None
See application file for complete search history.

(56) References Cited

U.S. PATENT DOCUMENTS 1,059,487 A 4/1913 Rich
8,745,882 B2 6/2014 Murgida et al.
(Continued)

FOREIGN PATENT DOCUMENTS

CN 102066059 A 5/2011
CN 102123835 A 7/2011
(Continued)

OTHER PUBLICATIONS

Chinese Office Action in corresponding Chinese Application No. 201980075049.4, dated Jun. 28, 2022 (20 pages).
(Continued)

*Primary Examiner* — Hwei-Siu C Payer
(74) *Attorney, Agent, or Firm* — Bookoff McAndrews, PLLC

(57) ABSTRACT

This application relates to a razor assembly comprising a blade assembly configured to removably connect with an attachment mechanism; a handle having a distal end configured to removably connect with the attachment mechanism providing a first pivotal movement about a first axis between the handle and the attachment mechanism; where the attachment mechanism comprises a connection portion configured to provide a second pivotal movement between the blade assembly and the attachment mechanism.

14 Claims, 5 Drawing Sheets

(56) References Cited

U.S. PATENT DOCUMENTS

| | | | | |
|---|---|---|---|---|
| 10,960,561 | B2 * | 3/2021 | Kim | B26B 21/225 |
| 2010/0313426 | A1 | 12/2010 | Royle | |
| 2013/0061481 | A1 | 3/2013 | Cooney | |
| 2013/0291391 | A1 * | 11/2013 | Stevens | B26B 21/521 30/530 |
| 2014/0230256 | A1 | 8/2014 | Christie et al. | |
| 2017/0087732 | A1 | 3/2017 | Metcalf et al. | |
| 2019/0255721 | A1 * | 8/2019 | Psimadas | B26B 21/523 |
| 2019/0366570 | A1 * | 12/2019 | Kopelas | B26B 21/24 |
| 2020/0039098 | A1 * | 2/2020 | Kopelas | B26B 21/225 |
| 2021/0402629 | A1 * | 12/2021 | Christofidellis | B26B 21/521 |

FOREIGN PATENT DOCUMENTS

| | | | | |
|---|---|---|---|---|
| CN | 102470536 | A | | 5/2012 |
| CN | 103140334 | A | | 6/2013 |
| CN | 103189170 | A | | 7/2013 |
| CN | 106061693 | A | | 10/2016 |
| CN | 106457586 | A | | 2/2017 |
| CN | 110430978 | A | | 11/2019 |
| DE | 20 2012 002692 | U1 | | 3/2013 |
| EP | 2 902 156 | A1 | | 8/2015 |
| EP | 3 348 363 | A1 | | 7/2018 |
| EP | 3348363 | | | 7/2018 |
| GB | 2 126 470 | A | * | 9/1983 |
| JP | 4-22388 | | * | 1/1992 |
| WO | WO 2018/007844 | A1 | | 1/2018 |
| WO | WO 2018/007845 | A1 | | 1/2018 |

OTHER PUBLICATIONS

Second Chinese Office Action issued in Chinese Application No. 2019800750494, issued on Feb. 15, 2023 (22 pages).

GilletteLabs, Oct. 19, 2018, The Heated Razor by GilletteLabs—Sold Out. Indiegogo. https:/www.indiegogo.com/projects/the-heated-razor-by-gillettelabs#/ (11 pages).

J. Fenner, Sep. 18, 2018, It's Surprisingly Fun to Shave With Gillette Labs' New Heated Razor. Gear Patrol. https://gearpatrol.com/2018/09/gillette-labs-heated-razor/ (9 pages).

International Preliminary Report on Patentability and Written Opinion issued in International Application No. PCT/EP2019/084960, issued Feb. 28, 2020 (14 pages).

* cited by examiner

BLADE ASSEMBLY ATTACHMENT MECHANISM AND MODULAR RAZOR ASSEMBLY

FIELD

This application is a National Stage Application of International Application PCT/EP2019/084960, filed on 12 Dec. 2019, now published as WO2020120703 and which claims benefit from European patent application EP 18212725.8 filed on 14 Dec. 2018 its content being incorporated herein by reference. The present description relates to a modular razor that has an interchangeable handle. More specifically, the description relates to a pivotable attachment device that may be selectively attachable to a blade assembly and to a razor handle, as well as a razor assembly comprising a handle, blade assembly, and the pivotable attachment device.

BACKGROUND

A common problem with razor assemblies having a single type of razor handle available is that the razor assembly is a "one size fits all" for potential customers or razor users. This may be frustrating to a customer who may desire a handle that is shaped differently to improve their ability to adequately manipulate the razor, for example, a smaller handle. The market has responded to this customer demand.

For Example, US 2013/061481 relates to safety razor with a disc-like form handle to enhance a user's manipulation of the razor assembly.

Another Example is US 2014/230256 which also relates to a safety razor having a substrate retaining member forming at least a partial ring, which further comprises elastomeric material to provide a softer feel to the user.

For Example, U.S. Pat. No. 1,059,487 relates to a safety razor that can be adjusted to different angles, to secure a desirable cutting angle.

For Example, WO 2018007844 relates to a reconfigurable shaving razor.

SUMMARY

The razor assembly may be specifically adapted for shaving facial, head, and/or body hair. To address the problems of providing a razor assembly adapted to be customizable by a user, a removable and pivotable attachment mechanism is provided as well as a razor assembly including a removable and pivotable attachment mechanism.

In particular, a razor assembly is provided.

The razor assembly comprises a blade assembly configured to removably connect with an attachment mechanism; a handle having a distal end configured to removably connect with the attachment mechanism providing a first pivotal movement about a first axis between the handle and the attachment mechanism; where the attachment mechanism comprises a connection portion configured to provide a second pivotal movement between the blade assembly and the attachment mechanism.

The handle distal end and the attachment mechanism may comprise a track including a guide rail and the other of the distal end and the attachment mechanism may comprise a channel configured to releasably connect with the track and guide rail so as to provide the first pivotal movement between the handle and the attachment mechanism.

The attachment mechanism may comprise a top portion and bottom portion which form the channel and the distal end of the handle may comprise the track and guide rail.

One or more of the top and bottom portions of the attachment mechanism may further include outer portions, wherein the outer portions are adapted to secure the attachment mechanism to the track of the handle.

The guide rail has a smaller width than the track.

One or more of the top and bottom portions of the attachment mechanism may further include a gripping feature.

One or more of the top and bottom portions of the attachment mechanism may further include a button for releasing the blade assembly.

The first pivotal movement may be configured to rotate within a range of 45 degrees to each side of the first axis A-A.

One of the handle distal end and the attachment mechanism may include a recess, and the other of the handle distal end and the attachment mechanism may comprise a return mechanism configured to connect to the recess so as to provide a return force against the first pivotal movement.

The return mechanism is elastically deformable such that when the attachment mechanism is in a rotated position, the return mechanism may be in a deformed state.

The attachment mechanism may be entirely or substantially circular.

The track of the handle may have an arcuate shape.

The attachment mechanism and blade assembly may rotate in concert relative to the handle.

The attachment mechanism may be oval shaped and the distal end of the handle may comprise an elastically deformable material such that when the attachment mechanism is in a rotated position, the handle distal end may be in a deformed state.

Due to the configuration of the attachment mechanism and razor including the attachment mechanism, an interchangeable handle can provide greater comfort and manipulability to the user. Further, the pivotable aspect of the attachment mechanism facilitates freedom of movement of the razor head, thus reducing the risk of nicks and cuts to a user during a shaving operation.

The above summary is not intended to describe each and every implementation of the concept. In particular, selected features of any illustrative embodiment within this disclosure may be incorporated into additional embodiments unless clearly stated to the contrary or incompatible.

BRIEF DESCRIPTION OF THE DRAWINGS

The disclosure may be more completely understood in consideration of the following detailed description of aspects of the disclosure in connection with the accompanying drawings, in which.

Figure 1A:
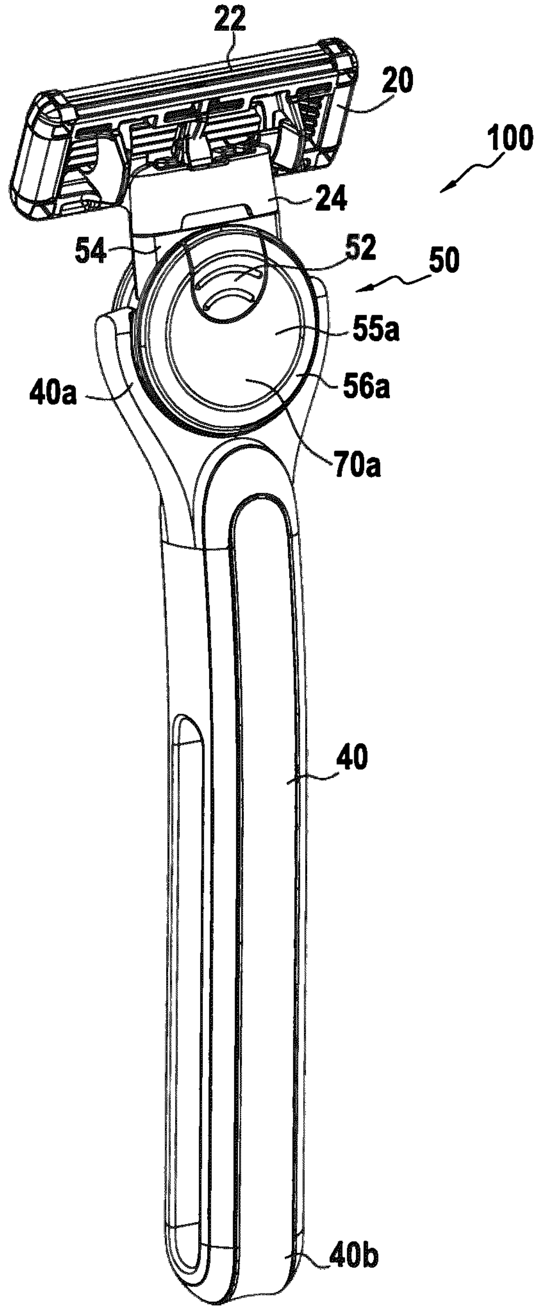
FIG. 1A is a perspective view of the top of a razor assembly according to an aspect.

While aspects of the disclosure are amenable to various modifications and alternative forms, specifics thereof have been shown by way of example in the drawings and will be described in detail. It should be understood, however, that the intention is not to limit aspects of the disclosure to the particular embodiment described. On the contrary, the intention of this disclosure is to cover all modifications, equivalents, and alternatives falling within the scope of the disclosure.

DETAILED DESCRIPTION

As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

The following detailed description should be read with reference to the drawings. The detailed description and the drawings, which are not necessarily to scale, depict illustrative aspects and are not intended to limit the scope of the invention. The illustrative aspects depicted are intended only as exemplary.

Figure 1B:
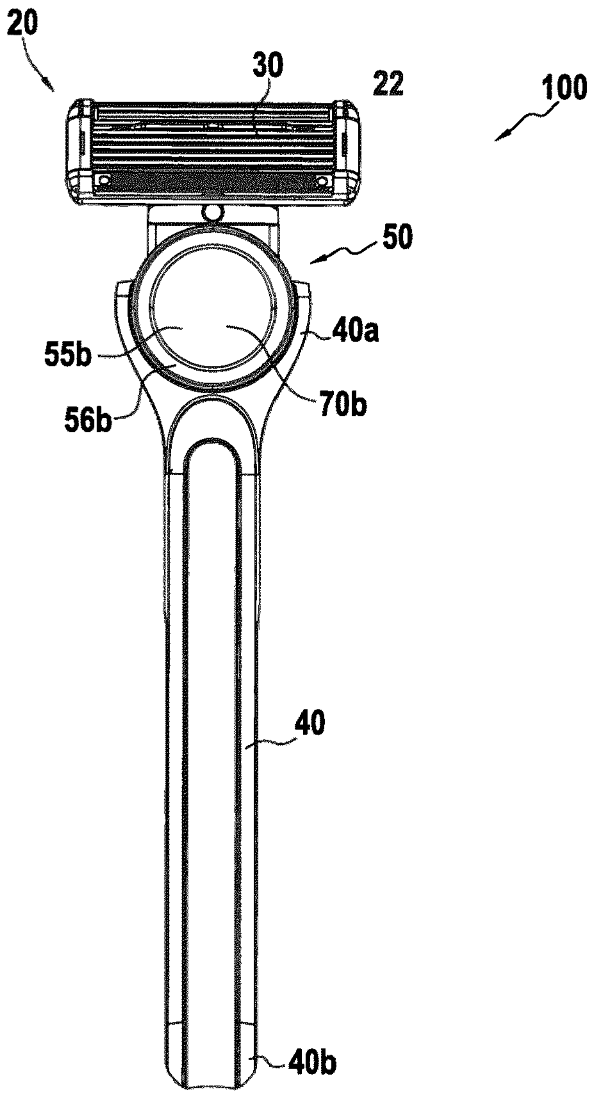
FIG. 1B is a bottom view of the razor assembly according to an aspect.

FIGS. 1A and 1B show a razor assembly 100 having a blade assembly 20, handle 40, and attachment mechanism 50. The blade assembly 20 may have a housing 22 that may be hollow and generally form a rectangular parallelepiped; however, the housing 22 may be any other suitable shape. The blade assembly 20 may further include a blade assembly attachment portion 24 configured to attach the blade assembly 20 to the attachment mechanism 50.

Secured within the housing 22 is at least one blade 30. In this embodiment, a plurality of blades 30 are shown; however, it is contemplated that the blade assembly 20 may have any number of blades 30. Additionally, the blades 30 that are shown are elongate in shape; however, it is contemplated that the blades 30 may be formed into any other suitable shape. It is also envisioned that the housing 22 may secure an exfoliating element rather than blades 30.

Figure 2:
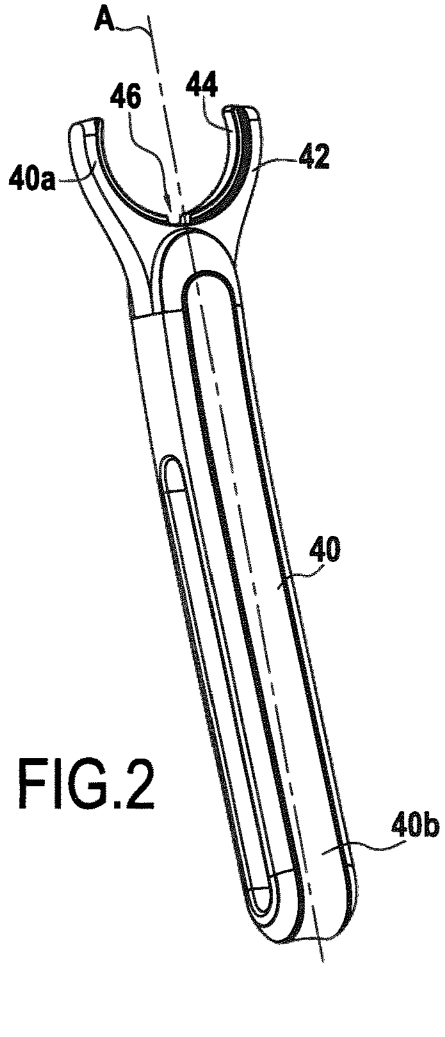
FIG. 2 is a perspective view of a handle according to an aspect.

Referring to FIG. 2, the handle 40 may be elongated extending along a vertical central axis A-A. The handle 40 may be shaped to adapt to the natural contours of a hand. The handle 40 has a distal end 40*a* and a proximal end 40*b*. The distal end 40*a* of the handle 40 may have an arcuate shape and may form a track 42 that is adapted to connect to the attachment mechanism 50.

The track 42 may include at least one guide rail 44. The guide rail 44 may be formed as a step having a width "Wg" in a range of 1 mm to 8 mm, more specifically 2.5 mm. The width "Wt" of the track 42 may be in a range of 3 mm to 12 mm, more specifically 5 mm. The width of the guide rail 44 may be smaller than the width of the track 42. The thickness "Wa" of the track 42 may be in a range of 0.5 to 4 mm, more specifically 1.5 mm. The track 42 and guide rail 44 may be integrally formed.

The handle 40 may further include a recess 46 that is configured to receive a return mechanism 58 of the attachment mechanism 50. The recess 46 may be positioned along the vertical central axis A-A. However, the recess 46 may be positioned in any other suitable location. For example, the recess 46 may be positioned in the attachment mechanism 50 and the return mechanism 58 on the handle.

The attachment mechanism 50 may be attached to the distal end 40*a* of the handle 40. The attachment mechanism 50 may include a button 52 for the selective attachment or release of the blade assembly 20. The blade assembly may be interchangeable, in particular, when a blade or blades of the blade assembly have been blunted. However, it is also envisioned that the blade assembly 20 and attachment mechanism may be integrated or may be fixedly attached.

The attachment mechanism 50 may have a circular or substantially circular shape. The diameter of the attachment mechanism may be within a range of 5 mm to 40 mm, more specifically from 10 mm to 30 mm, more specifically about 20 mm. However, it is contemplated the attachment mechanism may have an oval shape, which will be discussed in detail with reference to FIGS. 6 and 7. The attachment mechanism 50 may be removable from the handle 40. The attachment mechanism 50 may be configured to be used as a handle. The attachment mechanism 50 may have a top portion 55*a* (FIG. 1A) and a bottom portion 55*b* (FIG. 1B).

The top and bottom portions 55*a*, 55*b* may include respective outer portions 56*a*, 56*b*. The outer portions 56*a*, 56*b*, may be adapted to secure the attachment mechanism 50 to the track 42 of the handle 40.

Figure 3:
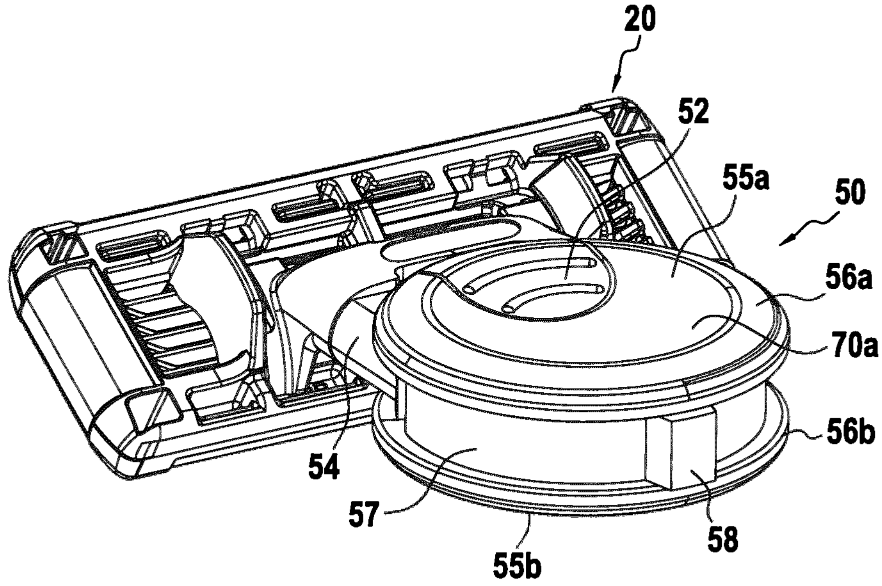
FIG. 3 is a perspective view of a blade assembly and attachment mechanism according to an aspect.

Referring to FIG. 3, the top portion 55*a* and bottom portion 55*b* of the attachment mechanism 50 may be connected to each other forming a channel 57. The channel 57 may be located between the respective outer portions 56*a*, 56*b* of the top and bottom portions 55*a*, 55*b*. The channel 57 may be adapted to interlock with the rail 42 of the handle 40.

The attachment mechanism 50 may be configured to provide a return force to the first pivotal movement. The attachment mechanism 50 may include a return mechanism 58. The return mechanism 58 may be flexible. The return mechanism 58 may comprise at least one flexible pin or finger or tongue. The return mechanism 58 may be adapted to exert a return torque on the recess 46. The return torque may be exerted on the recess 46 when the attachment mechanism 50 is rotated. The return torque generated by the return mechanism 58 may be in a range of 0 to 30 Nmm, more specifically between 10 and 30 Nmm, and even more specifically between 15 and 25 Nmm.

An increase of the return toque may depend on the amount that the attachment mechanism 50 is rotated or the angle. The increase of the return toque per degree may lie between 0.5 Nmm and 2 Nmm, specifically between 0.67 Nmm and 2 Nmm, and even more specifically between 1 and 1.67 Nmm.

The return mechanism 58 may comprise any material having a high elasticity, for example, an elastomer. The return mechanism 58 may be configured to connect with the recess 46 in the handle 40. Although the return mechanism 58 is depicted on the attachment mechanism 50, it is also envisioned that the return mechanism 58 may be formed on the handle 40 while the attachment mechanism 50 may have a corresponding recess.

It is also contemplated that the return mechanism 58 may be disposed at least partially inside of the attachment mechanism 50. The return mechanism 58 may have a substantially arcuate shape that is configured to interlock with the distal end 40*a* of the handle 40. The return mechanism 58 may include a projection that is configured to removably connect with the recess 46 in the handle 40. The return mechanism 58 may comprise at least one flexible tongue that is configured to control the movement of the attachment mechanism 50. The at least one tongue may extend from an inner surface of the arc toward a centroid of the arc. The return mechanism 58 may include a pair of flexible tongues that are configured to control the movement of the attachment mechanism 50. The each of the pair of tongues may extend from an inner surface of the arc toward the centroid of the arc. The pair of tongues may be diametrically disposed. The attachment mechanism 50 may include inner channels are that configured to engage at least one tongue. At least one tongue may be configured to exert a return torque on the inner channel.

Figure 4:
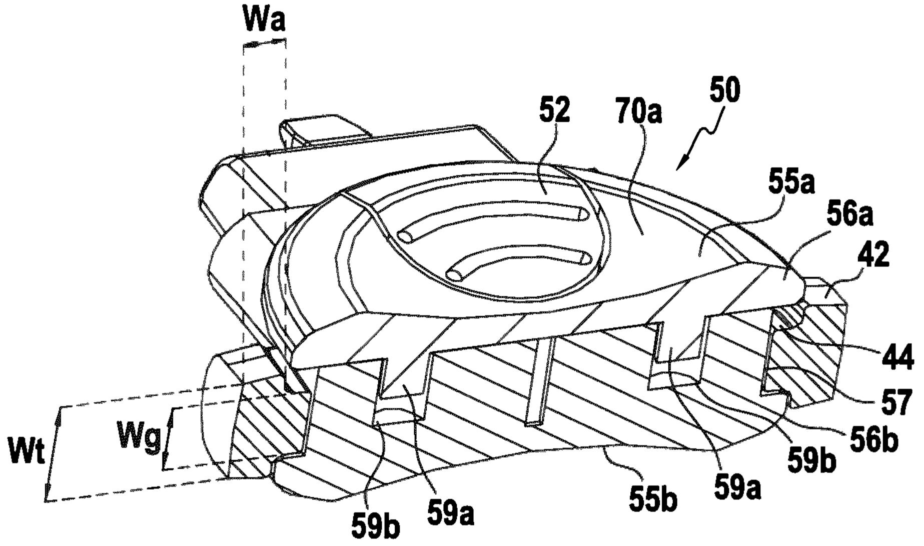
FIG. 4 is a cross-section of the attachment mechanism seated in the handle shown in FIG. 3 according to an aspect.

Referring to FIG. 4, the top and bottom portions 55*a*, 55*b* of the attachment mechanism 50 may have corresponding pins 59*a* and holes 59*b* so that they may be attached to each other. The attachment may be any suitable means, for example a snap fit. The guide rail 44 of the handle 40 may be configured to fit within channel 57 of the attachment mechanism 50. The track 42 of the handle 40 may be configured to slidably engage the respective outer portions 56*a*, 56*b* of the top and bottom portions 55*a*, 55*b* of the attachment mechanism 50. Additionally, the top and bottom portions 55*a*, 55*b* of the attachment mechanism 50 may include corresponding top and bottom gripping features 70*a*, 70*b* (shown on FIGS. 1A, 1B, 3, and 4). The gripping features 70*a*, 70*b* may be selected from, but not limited to, projections, rubber portions/layers, or surface texture. It is also envisioned that only one of the top or bottom portions 55*a*, 55*b* includes gripping features 70*a*, 70*b*.

Figure 5:
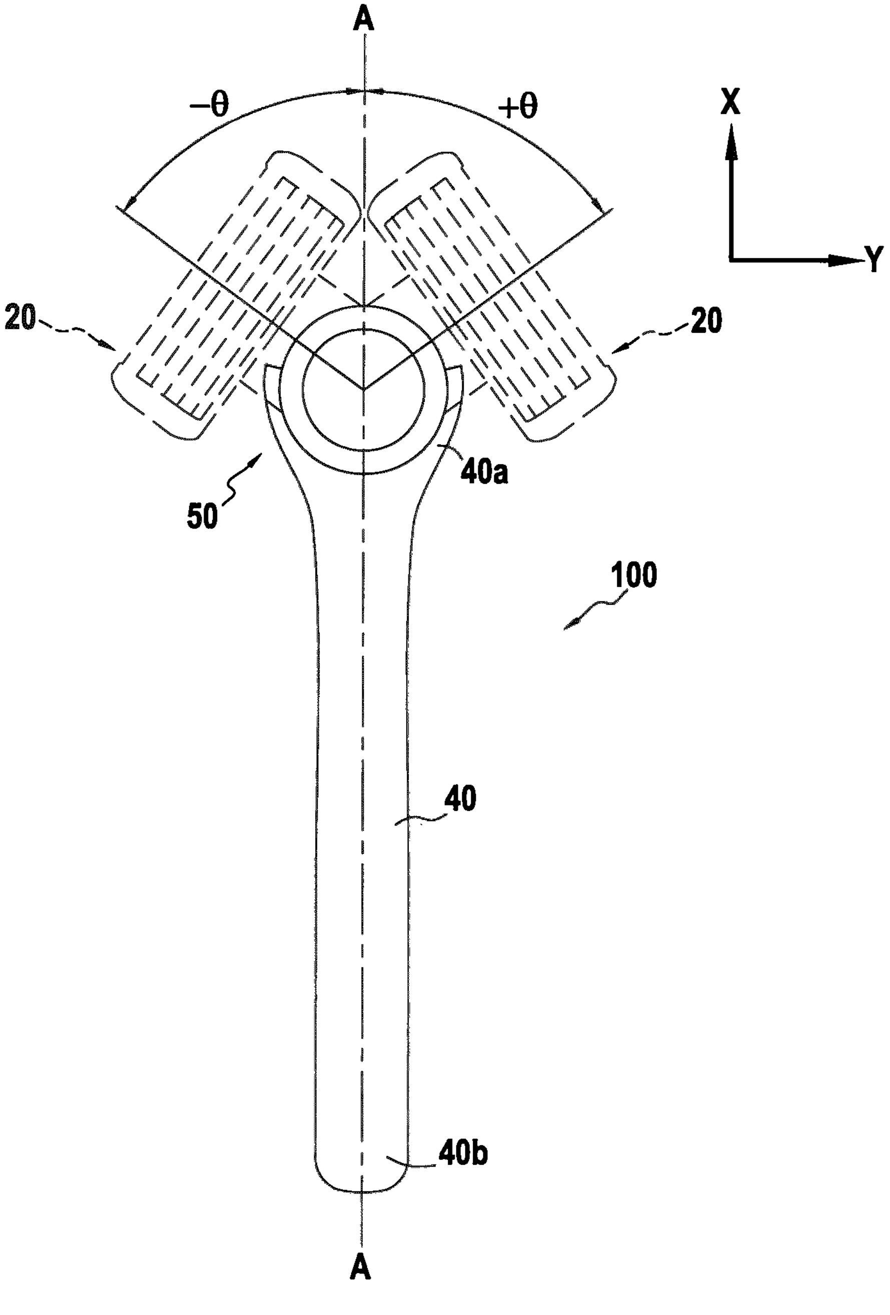
FIG. 5 is a bottom view of razor assembly when a blade assembly is in positive and negative rotated positions.

Referring to FIG. 5, due to the connection between the attachment mechanism 50 and the track 42 of the handle 40, the blade assembly 20 is configured to pivot relative to the handle 40. In particular, the blade assembly 20 may be configured to pivot within a range of $-\theta \leq x \leq +\theta$ relative to a central axis A-A of the handle 40. In operation, a razor assembly 100 may have a blade assembly 20 in a rest position where the center of the blade assembly 20 is aligned or substantially aligned with the central axis A-A.

A user may place the blade assembly 20 in a first pivot position at an angle $+\theta$ by applying a force on the blade assembly 20 along the y-axis. This force transitions the return mechanism from an equilibrium state to a deformed state. Once the blade assembly 20 is released, or does not have the external force applied thereon, the blade assembly 20 may rotate back to the rest position by operation of the return mechanism 58 moving from the deformed state to the equilibrium state. The respective outer portions 56*a*, 56*b*, of the attachment mechanism 50 act as guards that secure the attachment mechanism 50 to the track 42 of the handle 40 during rotation of the attachment mechanism 50.

To assemble the components of the razor assembly 100, a user may first obtain the attachment mechanism 50. Thereafter, a user may connect the attachment mechanism connection portion 54 with the blade assembly attachment portion 24. With this configuration, a user may opt to use attachment mechanism 50 as a handle for shaving. This configuration is beneficial in that the economical size of the attachment mechanism 50 connected with the blade assembly 20 facilitates storage and portability.

However, a user may desire to use an elongated handle 40. In this circumstance, the user may take a further step of connecting the attachment mechanism 50 with the handle 40. This may be achieved by connecting the return mechanism 58 to the corresponding recess 46 in the handle 40, and then positioning the track 44 within the corresponding channel 57. In this configuration, the blade assembly 20 is pivotable relative to the handle 40. A pivotable blade assembly 20 reduces the risk of nicks and cuts during a shaving operation because the blade assembly 20 can adapt to the contours in human skin.

Additionally, because of the configuration of a razor assembly 100 having an interchangeable handle 40, a user is able to customize the handle 40. In particular, a user may desire the have a larger handle 40 or a smaller handle 40 to enhance their ability to effectively manipulate the razor assembly 100. It is also envisioned that a user may desire to have a particular handle shape, e.g., with a dramatic curve or angle, and is thus able to attach that handle 40 with the attachment mechanism 50 and blade assembly 20 to create a customized razor assembly 100. This is beneficial because a user feels more comfortable during a shaving operation. Also, by enhancing the level of comfort, the risk of nicks and cuts can be reduced.

Figure 6:
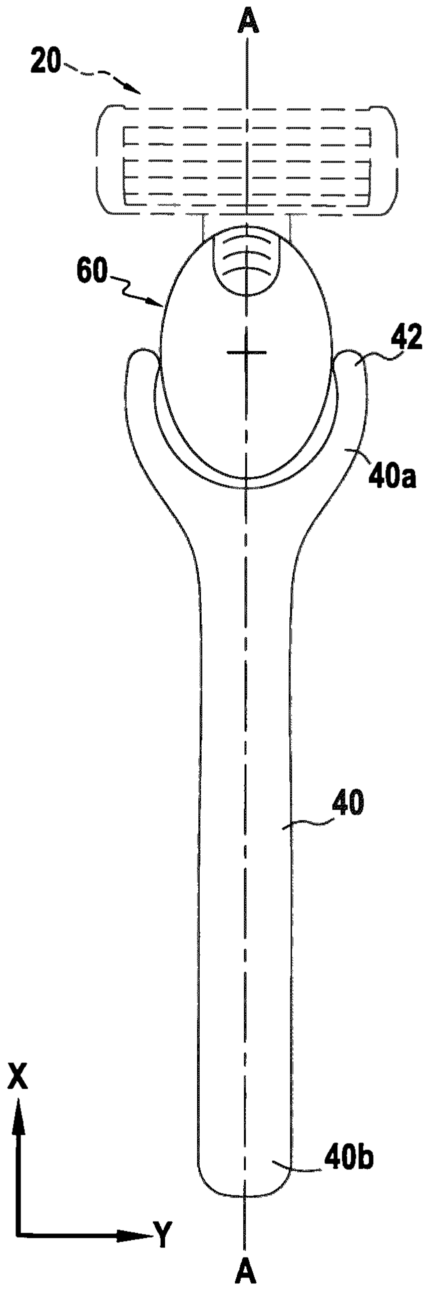
FIG. 6 is a perspective view of the top of a razor assembly according to another aspect.

Referring to FIG. 6, the attachment mechanism 60 is substantially the same as attachment mechanism 50, thus the differences will be discussed and like references will be used instead of repeating excerpts of the description.

The attachment mechanism 60 may be entirely or substantially oval shaped having a minor axis with a range of 5-40 mm, more specifically 10-30 mm, more specifically about 20 mm and a major axis with a range of 15-50 mm, more specifically 20-40 mm, more specifically about 30 mm. The intersection of the major and minor axes may or may not be coincident with the center of the attachment mechanism 60, thus, the attachment mechanism 60 may have an elliptical or egg shape.

In this configuration, the attachment mechanism may not include a return mechanism. In this configuration, the track 42 of the handle 40 may be configured to control the return of the attachment mechanism 60 into the rest position. This may be achieved, for example, by the track 42 being comprised of an elastic material.

Figure 7:
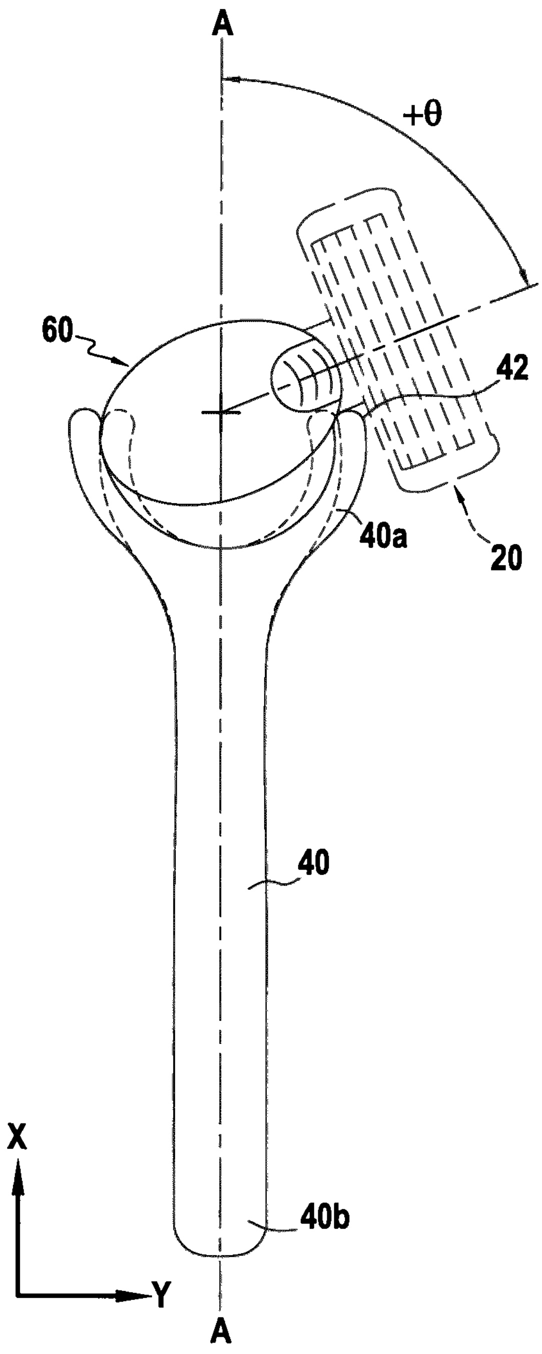
FIG. 7 is a bottom view of razor assembly of FIG. 6 when a blade assembly is in positive and negative rotated positions.

Referring to FIG. 7, in operation, for example, if a force is applied to the attachment mechanism 60 which orients it into a rotated position, the track 42 is in a deformed state as a result. Once the attachment mechanism 60 is released, the track 42 may return to its equilibrium position, thus urging the attachment mechanism 60 back into the rest position.

Although the described embodiments were provided as different exemplary embodiments, it is envisioned that these embodiments are combinable or, when not conflicting, the features recited in the described embodiments may be interchangeable.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A razor assembly comprising:

a blade assembly configured to removably connect with an attachment mechanism;

a handle having a distal end configured to removably connect with the attachment mechanism providing a first pivotal movement about an axis perpendicular to a first axis between the handle and the attachment mechanism;

wherein the attachment mechanism comprises a connection portion configured to provide a second pivotal movement between the blade assembly and the attachment mechanism, wherein the handle and the attachment mechanism are configured to provide a return force against the first pivotal movement, wherein one of the handle distal end and the attachment mechanism includes a recess, and the other of the handle distal end and the attachment mechanism comprises a return mechanism, wherein the return mechanism is configured to connect to the recess so as to provide the return force against the first pivotal movement and allow removably connecting the attachment mechanism to the handle.

2. The razor assembly according to claim 1, wherein one of the handle distal end and the attachment mechanism comprises a track including a guide rail and the other of the distal end and the attachment mechanism comprises a channel configured to releasably connect with the track and the guide rail so as to provide the first pivotal movement between the handle and the attachment mechanism.

3. The razor assembly according to claim 2, wherein the attachment mechanism comprises a top portion and a bottom portion connected to each other forming the channel and the distal end of the handle comprises the track and the guide rail, wherein one or more of the top and bottom portions of the attachment mechanism further include outer portions, wherein the outer portions are adapted to secure the attachment mechanism to the track of the handle.

4. The razor assembly according to claim 3, wherein the guide rail has a smaller width than the track.

5. The razor assembly according to claim 3, wherein the one or more of the top and bottom portions of the attachment mechanism further include a gripping feature.

6. The razor assembly according to claim 3, wherein the one or more of the top and bottom portions of the attachment mechanism further include a button for releasing the blade assembly.

7. The razor assembly according to claim 2, wherein the track has an arcuate shape.

8. The razor assembly according to claim 1, wherein the attachment mechanism is configured to rotate within a range of 45 degrees to each side of the first axis.

9. The razor assembly according to claim 1, wherein the return mechanism is elastically deformable such that when the attachment mechanism is in a rotated position, the return mechanism is in a deformed state.

10. The razor assembly according to claim 1, wherein the attachment mechanism is substantially circular.

11. The razor assembly according to claim 1, wherein the attachment mechanism and the blade assembly rotate in concert relative to the handle.

12. The razor assembly according to claim 1, wherein the handle is of unitary construction.

13. The razor assembly according to claim 1, wherein the return mechanism includes a protrusion such that connecting the handle with the attachment mechanism requires only placing the protrusion at least partially within the recess.

14. The razor assembly according to claim 1, wherein the return mechanism includes a protrusion such that connecting the handle with the attachment mechanism requires only placing the protrusion at least partially within the recess, and wherein removing the handle and the attachment mechanism from each other requires only pulling the protrusion out of the recess.

* * * * *